United States Patent
Chu et al.

(10) Patent No.: US 7,369,352 B2
(45) Date of Patent: May 6, 2008

(54) APPARATUS, MEDIUM, AND METHOD WITH SEEK SERVO CONTROL CONSIDERING TEMPERATURE CHANGE

(75) Inventors: Sang-hoon Chu, Yongin-si (KR); Nam-guk Kim, Anyang-si (KR); Cheol-hoon Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 30 days.

(21) Appl. No.: 11/409,056

(22) Filed: Apr. 24, 2006

(65) Prior Publication Data
US 2006/0268449 A1    Nov. 30, 2006

(30) Foreign Application Priority Data
May 24, 2005    (KR) ............... 10-2005-0043813

(51) Int. Cl.
*G11B 5/596* (2006.01)
(52) U.S. Cl. .................................. 360/78.06
(58) Field of Classification Search ............ None
See application file for complete search history.

(56) References Cited

U.S. PATENT DOCUMENTS

| | | | |
|---|---|---|---|
| 4,982,298 A | 1/1991 | Volz et al. | |
| 5,128,813 A * | 7/1992 | Lee | 360/78.07 |
| 5,268,804 A | 12/1993 | Wallis | |
| 6,614,615 B1 * | 9/2003 | Ju et al. | 360/78.04 |
| 6,765,746 B2 * | 7/2004 | Kusumoto | 360/75 |
| 7,061,714 B1 * | 6/2006 | Yu | 360/78.07 |

FOREIGN PATENT DOCUMENTS

| | | |
|---|---|---|
| JP | 02-126481 | 5/1990 |
| JP | 4-116707 | 4/1992 |
| JP | 5-266615 | 10/1993 |
| JP | 9-231698 | 9/1997 |
| JP | 2003-123414 | 4/2003 |

OTHER PUBLICATIONS

Korean Office Action dated Aug. 28, 2006 for related Korean Patent Application No. 10-2005-0043813.

* cited by examiner

*Primary Examiner*—K. Wong
(74) *Attorney, Agent, or Firm*—Staas & Halsey LLP

(57) ABSTRACT

An apparatus, medium, and method to control a disk drive, and in particular, an apparatus, medium, and method controlling a disk drive to perform a seek mode at an optimum state with respect to an operational temperature. A seek servo control method considering temperature change in controlling a disk drive may includes determining a seek time considering a given seek length and operational temperature change in a seek mode, and generating position, velocity, and acceleration trajectories to move a transducer according to the determined seek time.

37 Claims, 6 Drawing Sheets

APPARATUS, MEDIUM, AND METHOD WITH SEEK SERVO CONTROL CONSIDERING TEMPERATURE CHANGE

CROSS-REFERENCE TO RELATED APPLICATIONS

This application claims the priority benefit of Korean Patent Application No. 10-2005-0043813, filed on May 24, 2005, in the Korean Intellectual Property Office, the disclosure of which is incorporated herein in its entirety by reference.

BACKGROUND OF THE INVENTION

1. Field of the Invention

Embodiments of the present invention relate, at least as discussed herein, to an hard disk drive apparatus, medium, and method, and more particularly, to an apparatus, medium, and method performing a seek mode, e.g., in a hard disk drive, at an optimum state with respect to an operational temperature.

2. Description of the Related Art

Generally, hard disk drives are one of several data storage apparatuses that reproduce data recorded on a medium, such as a disk, and/or that write user data on such a medium using a magnetic head, for example, and by doing so, may play a contributory role in operating a computer system, for example.

Recently, disk drives have been widely used in a variety of fields such as consumer electronic products, vehicle navigation apparatuses, etc., in addition to such computer systems. Accordingly, the available environments in which disk drives may operate, especially with regard to temperature conditions, have become more diversified.

Also, as disk drives are increasing in capacity and density, as well as decreasing in size, there has been an increase in bits per inch (BPI), i.e., the density in the disk rotation direction, and tracks per inch (TPI), i.e., the density along the radius direction. Accordingly, with such increases there is a need for a more precise control mechanism.

A disk drive may have a plurality of magnetic transducers capable of writing information on and/or reading information from a single, or plurality, of disks, e.g., by sensing and magnetizing magnetic fields along portions of each of the disks. This information may be stored in a plurality of sectors in circular tracks, for example, with track numbers being given to tracks disposed on each surface of the disks. The number of tracks being vertically similar may sometimes be referred together as a cylinder, and accordingly, a singular track may sometimes be defined by its corresponding cylinder number.

Typically, each transducer may be integrated along the inside of a slider attached to a head gimbal assembly (HGA), with each HGA being attached to an actuator arm, for example. The actuator arm may have a voice coil located close with a magnetic assembly defining a voice coil motor. Accordingly, such a hard disk drive may typically include a corresponding driving circuit and controller providing a current exciting the voice coil motor. The excited voice coil motor may, thus, rotate the actuator arm such that transducers move across the surface of the disk(s) for reading and/or writing data from/to a corresponding disk.

When information is written and/or read, the hard disk drive may perform a seek routine to move the transducer from one cylinder to another. During this seek routine, the voice coil motor may be excited by a current so as to move transducers to a cylinder position over the surface of the disk. The controller may perform a servo routine, e.g., for guaranteeing that the transducer moves to a target cylinder and, potentially, a center portion of a track accurately.

It is typically desirable that the amount of time required for reading information from and/or writing information to disk(s) is minimized. Accordingly, the seek routine performed by the drive should move transducers to a new cylinder position within the shortest amount time. Additionally, the settling time of the HGA should typically be minimized in order for the transducer to write an/or read information quickly and to be positioned close to a new cylinder. That is, a seek time, which may be a measure of hard disk drive's performance evaluation, should be minimized.

In a seek mode, acceleration, velocity, and position trajectories in relation to a seek length may be generated, and error values between a current velocity and current position and a design, e.g., ideal or expected, velocity and design position generated based on the acceleration trajectory may be fed back. Then, a corresponding seek current may be applied to the voice coil motor. This design trajectory may be derived from modeling of the voice coil motor and the driving circuit, for example.

This design trajectory may be designed based on an idealistic model, for example, with the difference of the model and an actual system being designed to have sufficient margins so to avoid potential variance problems. As another example, a representative technology, as discussed in U.S. Pat. No. 6,801,384, is to use a seek servo algorithm of an idealistic sine waveform designed with consideration of a power supply constraint.

Generally, if the environmental operational temperature of a hard disk changes, the performance of the disk drive also changes. For example, as the temperature rises, the resistance value of the coil in the voice coil motor increases, and by diminution of magnetic force of the permanent magnet, a corresponding torque constant decreases such that the seek trajectory designed based on an idealistic environment cannot be followed in a high temperature, or if it is followed the result is unacceptable. Accordingly, the seek trajectory has been designed based on worst case high temperature, which in turn causes degradation of the seek performance at room temperatures.

SUMMARY OF THE INVENTION

Embodiments of the present invention, at least as discussed herein, include an apparatus, medium, and method with seek servo control considering temperature change, such that a seek time is adaptively changed with respect to a change in operational temperature in a disk drive.

To achieve the above and/or other aspects and advantages, embodiments of the present invention include at least a seek servo control method considering temperature change for controlling a disk drive, the method including determining a seek time based on a given seek length and operational temperature change of the disk drive, in a seek mode, and generating position, velocity, and acceleration trajectories to move a transducer of the disk drive according to the determined seek time.

To achieve the above and/or other aspects and advantages, embodiments of the present invention include at least a seek servo control method considering temperature change for controlling a disk drive, the method including determining a seek time based on a given seek length and operational temperature change of the disk drive, in a seek mode, and generating position, velocity, and acceleration trajectories to move a transducer of the disk drive according to the determined seek time, wherein the seek time is determined by considering a change amount of a voltage corresponding to a resistance change of a voice coil motor of the disk drive with respect to operational temperature change.

To achieve the above and/or other aspects and advantages, embodiments of the present invention include at least a seek servo control method considering temperature change for controlling a disk drive, the method including determining a seek time based on a given seek length and operational temperature change of the disk drive, in a seek mode, and generating position, velocity, and acceleration trajectories to move a transducer of the disk drive according to the determined seek time, wherein the seek time is determined by considering together a change amount of a torque constant of a voice coil motor and a change amount of a voltage corresponding to a resistance change of the voice coil motor with respect to operational temperature change.

To achieve the above and/or other aspects and advantages, embodiments of the present invention include at least a seek servo control method considering temperature change for controlling a disk drive, the method including determining a seek time based on a given seek length and operational temperature change of the disk drive, in a seek mode, and generating position, velocity, and acceleration trajectories to move a transducer of the disk drive according to the determined seek time, wherein the seek mode considers a voltage limit of a voice coil motor of the disk drive.

Here, the seek time may be determined to be within a range that a maximum value of a voltage trajectory for the voice coil motor does not exceed a limited supply voltage for the voice coil motor.

In addition, the seek mode may use a sine waveform seek servo control method.

The seek time may be determined by using a first table or table portion defining a relationship between seek times with respect to seek lengths at standard temperatures, and a second table or table portion defining adjustment values of seek times with respect to operational temperatures.

Further, seek times corresponding to given seek times and sensed operational temperatures, and adjustment values of the seek times may be readable from the first table or table portion and the second table or table portion, respectively, such that the seek time is determined by a calculation reflecting an adjustment value for a seek time read from the second table or table portion based on a value read from the first table or table portion.

The seek time is calculated by using a polynomial approximating a relationship between seek lengths and seek times with respect to operational temperature.

To achieve the above and/or other aspects and advantages, embodiments of the present invention include at least a seek servo control method considering temperature change in seek controlling of a disk drive, the method including calculating a standard seek time with respect to a seek length based on a standard temperature if a seek command is input, sensing an operational temperature of the disk drive, calculating an adjustment value for a seek time corresponding to a difference between the standard temperature and the operational temperature, calculating a final seek time by reflecting the adjustment value of the seek time with the standard seek time, generating position, velocity, and acceleration trajectories based on the final seek time, and performing track seek control by using the generated position, velocity, and acceleration trajectories.

To achieve the above and/or other aspects and advantages, embodiments of the present invention include at least a seek servo control method considering temperature change in seek controlling of a disk drive, the method including calculating a standard seek time with respect to a seek length based on a standard temperature if a seek command is input, sensing an operational temperature of the disk drive, calculating an adjustment value for a seek time corresponding to a difference between the standard temperature and the operational temperature, calculating a final seek time by reflecting the adjustment value of the seek time with the standard seek time, generating position, velocity, and acceleration trajectories based on the final seek time, and performing track seek control by using the generated position, velocity, and acceleration trajectories, wherein the adjustment value of the seek time is determined by considering a change amount of a voltage corresponding to a resistance change of a voice coil motor of the disk drive with respect to operational temperature change.

To achieve the above and/or other aspects and advantages, embodiments of the present invention include at least a seek servo control method considering temperature change in seek controlling of a disk drive, the method including calculating a standard seek time with respect to a seek length based on a standard temperature if a seek command is input, sensing an operational temperature of the disk drive, calculating an adjustment value for a seek time corresponding to a difference between the standard temperature and the operational temperature, calculating a final seek time by reflecting the adjustment value of the seek time with the standard seek time, generating position, velocity, and acceleration trajectories based on the final seek time, and performing track seek control by using the generated position, velocity, and acceleration trajectories, wherein the adjustment value of the seek time is determined by considering together a change amount of a torque constant of a voice coil motor and a change amount of a voltage corresponding to a resistance change of the voice coil motor of the disk drive with respect to operational temperature change.

To achieve the above and/or other aspects and advantages, embodiments of the present invention include at least a servo control method considering temperature change in seek controlling of a disk drive, the method including calculating a standard seek time with respect to a seek length based on a standard temperature if a seek command is input, sensing an operational temperature of the disk drive, calculating an adjustment value for a seek time corresponding to a difference between the standard temperature and the operational temperature, calculating a final seek time by reflecting the adjustment value of the seek time with the standard seek time, generating position, velocity, and acceleration trajectories based on the final seek time, and performing track seek control by using the generated position, velocity, and acceleration trajectories, wherein the position, velocity, and acceleration trajectories are generated by seek servo algorithm considering a voltage limit of a voice coil motor of the disk drive.

The final seek time may be determined to be within a range that a maximum value of a voltage trajectory for the voice coil motor does not exceed a limited supply voltage.

Further, the seek mode may use a sine waveform seek servo control method.

The final seek time may be determined by using a first table or table portion defining a relationship between seek times with respect to seek lengths at standard temperatures, and a second table or table portion defining adjustment values of seek times with respect to operational temperatures.

Here, seek times corresponding to given seek times and sensed operational temperatures, and adjustment values of the seek times may be readable from the first table or table portion and the second table or table portion, respectively, such that the final seek time is determined by a calculation reflecting an adjustment value for a seek time read from the second table or table portion based on a value read from the first table or table portion.

The final seek time may be calculated by using a polynomial approximating a relationship of seek lengths and seek times with respect to operational temperatures.

To achieve the above and/or other aspects and advantages, embodiments of the present invention include at least a disk drive in a data storage apparatus, the disk drive including a transducer to write information on and/or read information from a disk, a voice coil motor to move the transducer, a temperature sensing unit to measure an operational temperature of the disk drive, and a controller to determine a seek time by considering a seek length and the operational temperature, to generate position, velocity and acceleration trajectories according to the determined seek time, and by using the generated position, velocity, and acceleration trajectories, to control a driving current of the voice coil motor.

To achieve the above and/or other aspects and advantages, embodiments of the present invention include at least a disk drive in a data storage apparatus, the disk drive including a transducer to write information on and/or read information from a disk, a voice coil motor to move the transducer, a temperature sensing unit to measure an operational temperature of the disk drive, and a controller to determine a seek time by considering a seek length and the operational temperature, to generate position, velocity and acceleration trajectories according to the determined seek time, and by using the generated position, velocity, and acceleration trajectories, to control a driving current of the voice coil motor, wherein the seek time is determined by considering a change amount of a voltage corresponding to a resistance change of the voice coil motor with respect to operational temperature change.

To achieve the above and/or other aspects and advantages, embodiments of the present invention include at least a disk drive in a data storage apparatus, the disk drive including a transducer to write information on and/or read information from a disk, a voice coil motor to move the transducer, a temperature sensing unit to measure an operational temperature of the disk drive, and a controller to determine a seek time by considering a seek length and the operational temperature, to generate position, velocity and acceleration trajectories according to the determined seek time, and by using the generated position, velocity, and acceleration trajectories, to control a driving current of the voice coil motor, wherein the seek time is determined by considering together a change amount of a torque constant of the voice coil motor and a change amount of a voltage corresponding to a resistance change of the voice coil motor with respect to operational temperature change.

To achieve the above and/or other aspects and advantages, embodiments of the present invention include at least a disk drive in a data storage apparatus, the disk drive including a transducer to write information on and/or read information from a disk, a voice coil motor to move the transducer, a temperature sensing unit to measure an operational temperature of the disk drive, and a controller to determine a seek time by considering a seek length and the operational temperature, to generate position, velocity and acceleration trajectories according to the determined seek time, and by using the generated position, velocity, and acceleration trajectories, to control a driving current of the voice coil motor, wherein the position, velocity, and acceleration trajectories are generated considering a voltage limit of the voice coil motor.

The seek time may be determined to be within a range that a maximum value of a voltage trajectory for the voice coil motor does not exceed a limited supply voltage.

In addition, the seek mode may use a sine waveform seek servo control method.

The seek times may be determined by using a first table or table portion defining a relationship between seek times with respect to seek lengths at standard temperatures, and a second table or table portion defining adjustment values of seek times with respect to operational temperatures.

Seek times corresponding to given seek times and sensed operational temperatures, and adjustment values of the seek times may be readable from the first table or table portion and the second table or table portion, respectively, such that the seek time is determined by a calculation reflecting an adjustment value for a seek time read from the second table or table portion based on a value read from the first table or table portion.

The seek time may be calculated by using a polynomial approximating a relationship of seek lengths and seek times with respect to operational temperatures.

In addition, the determining of the seek time may include calculating a standard seek time with respect to a seek length based on a standard temperature, sensing the operational temperature of the disk drive, calculating the adjustment value of the seek time corresponding to a difference between the standard temperature and the operational temperature, and calculating a final seek time by reflecting the adjustment value of the seek time with the standard seek time.

To achieve the above and/or other aspects and advantages, embodiments of the present invention include at least one medium including computer readable code to implement method embodiments of the present invention.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
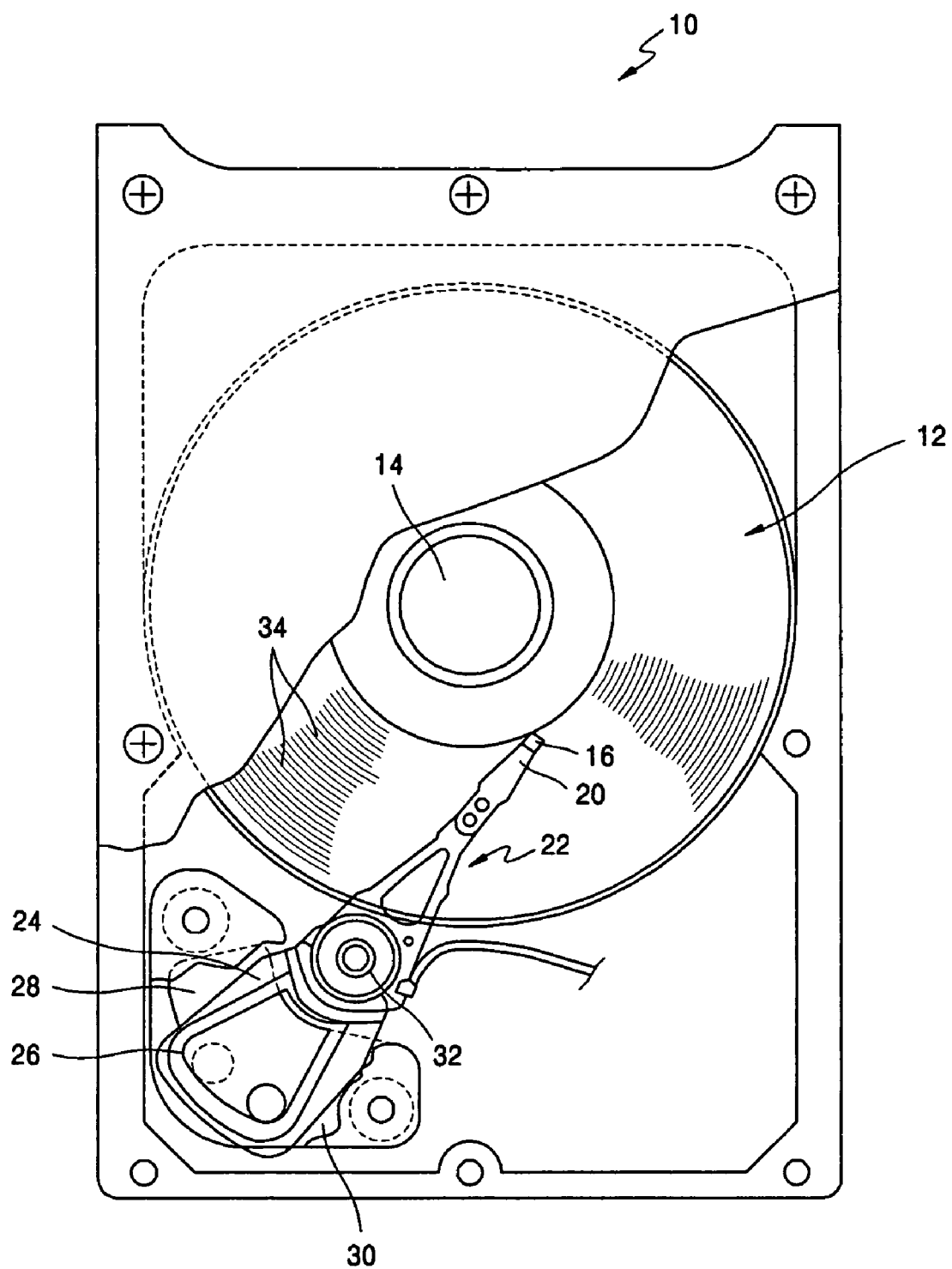
FIG. 1 illustrates a hard disk drive, according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

Embodiments of the present invention, at least as discussed herein, will be discussed based on the fact that in calculating a seek time for a given seek length in a hard disk drive the voltage of power supplied to a voice coil motor is limited. In an embodiment, a transducer may be integrated within a slider attached to a head gimbal assembly (HGA), with the HGA being attached to an actuator arm capable of moving the transducer across the surface of the disk. Movements of the actuator arm and the transducer may be controlled by a controller, e.g., such that the controller controls the movement of the transducer from a current track to another track according to a seek servo control routine.

FIG. 1 illustrates a hard disk drive, according to an embodiment of the present invention. The drive 10 may include at least one magnetic disk 12 rotated by a spindle motor 14. The drive may also include a transducer 16 positioned close to a surface of the disk 12.

The transducer 16 can read/write information from/to the rotating disk 12 by sensing and magnetizing a magnetic field of a portion of each disk 12. Here, typically, the transducer 16 may be coupled with the surface of each disk 12. Though the single transducer 16 is shown, it should be understood that there may also be a separate recording transducer for magnetizing a portion of the disk 12 and a reading transducer sensing a magnetic field of a portion of the disk 12. Here, the reading transducer may also be formed with a magneto-resistive (MR) device.

As noted above, the transducer 16 may be integrated into a slider 20, such that the slider 20 may have a structure for generating an air bearing between the transducer 16 and the surface of the disk 12. The slider 20 may further be coupled with a head gimbal assembly 22, with the head gimbal assembly being attached to an actuator arm 24 having a voice coil 26. The voice coil 26 may be disposed close to a magnetic assembly 28 making up a voice coil motor (VCM) 30, such that a current provided to the voice coil 26 may generate a torque for rotating the actuator arm 24 about the bearing assembly 32. Accordingly, the rotation of the actuator arm 24 can move the transducer 16 across the surface of the disk 12.

Typically, information may be stored along circular tracks 34 of the disk 12, with each track 34 generally including a plurality of sectors. Each sector may include a data field and an identification field. The identification field may be formed with a gray code identifying a sector and a track (cylinder). Accordingly, the transducer 16 may move across the surface of the disk 12 to read/write information from/to different tracks. The operation of moving the transducer from one track to another is generally referred to as a seek mode.

Figure 2:
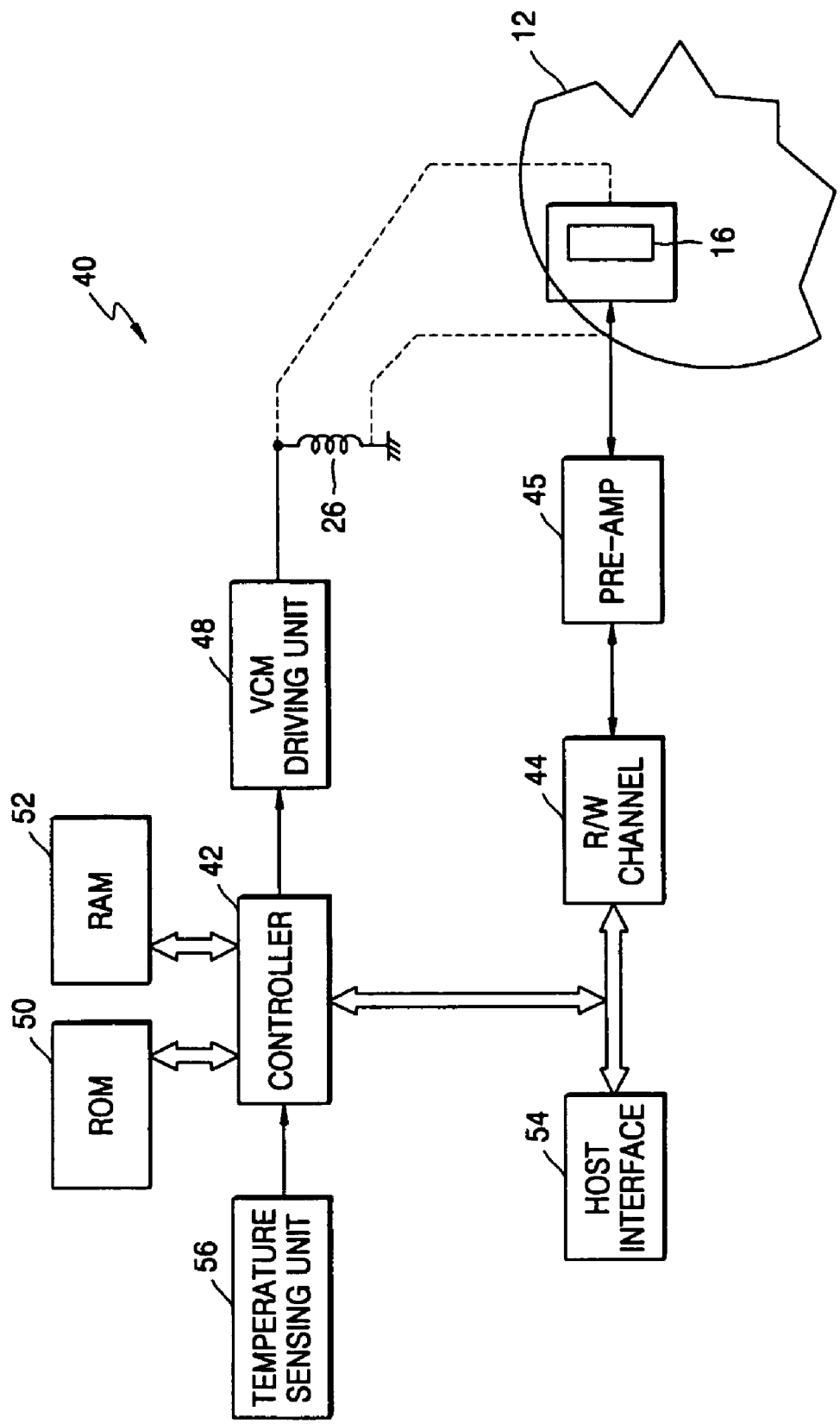
FIG. 2 illustrates a system to control a hard disk drive, according to an embodiment of the present invention.

FIG. 2 illustrates a system 40 to control a hard disk drive 10, such as that of FIG. 1. The system 40 may include a disk 12, a transducer 16, a controller 42, a read/write channel 44, a pre-amp 45, a voice coil motor driving unit 48, a ROM 50, a RAM 52, a host interface 54, and a temperature sensing unit 56, for example.

Here, it is briefly noted that, in some embodiments, ROM 50 may include a variety of commands and data to be used by the controller 42, e.g., in order to execute computer readable code, e.g., such as software routines. As one of the software routines, there may be included a seek servo control routine for moving the transducer 16 from one track to another. Also, the ROM 50 may store equations for generating acceleration, velocity, and position trajectories of a sine waveform based on a limited voltage, for example.

In a more particular example, the ROM 50 may store first table information identifying relationships between seek lengths and seek times based on a standard temperature and second table information identifying relationships between an operational temperature and an adjustment value of a seek time. More specific methods of calculating this first and second table information will be explained in greater detail below.

As noted, the first and second table information may be stored in the ROM 50. In addition, e.g., such tables may, in addition or as an alternative, be stored in a maintenance cylinder area of the disk 12, for example. In addition, the separate tables may merely be portions of the same or different tables, for example.

Information used for driving the hard disk drive, which may be read from the ROM 50 or the disk 12, for example, when the drive begins to operate, may be stored in RAM 52.

The temperature sensing unit 56 may measure a temperature inside of the disk drive, and for example, the temperature may be measured by using a thermistor.

The controller 42 may analyze a command received from a host device (not shown), and perform control corresponding to the analyzed result. The controller 42 may further provide a control signal to the VCM driving unit 48, for example, in order to control excitement of the voice coil motor and the motion of the transducer 16.

A general operation of the disk drive will now be explained in greater detail.

In a data read mode, the pre-amp 45 may amplify an electric signal sensed by the transducer 16 from the disk 12. Then, the read/write channel 44 may control a gain of an automatic gain control circuit (not shown) so that the level of the amplified signal becomes a predetermined level. The analog signal, amplified to the predetermined level by the automatic gain control circuit, may be coded into a digital signal that can be read by the host device (not shown), converted into stream data, and then transmitted to the host device through the host interface 54, for example.

In a data write mode, the disk drive may receive input data from a host device, e.g., through the host interface 54, and convert the data into a binary data stream appropriate to the write channel, by the read/write channel 44, and then write the write current amplified by the pre-amp 45 on the disk 12 through the transducer 16.

The seek servo control routine, according to an embodiment of the present invention, as performed in the controller 42, will now be explained in greater detail.

If a seek command is input, the controller 42 may determines the appropriate seek time by considering a given seek length and a measured operational temperature, and according to the determined seek time, generate position, velocity, and acceleration trajectories and, further, by using the generated position, velocity, and acceleration trajectories, control the driving current of the voice coil motor.

After the controller 42 calculates a standard seek time, with respect to the seek length based on a standard temperature, an adjustment value of the seek time with respect to the difference between the standard temperature and the current operational temperature, e.g., measured in the temperature sensing unit 56, may be calculated, and by reflecting the adjustment value of the seek time with the standard seek time, a final seek time may be calculated.

Figure 3:
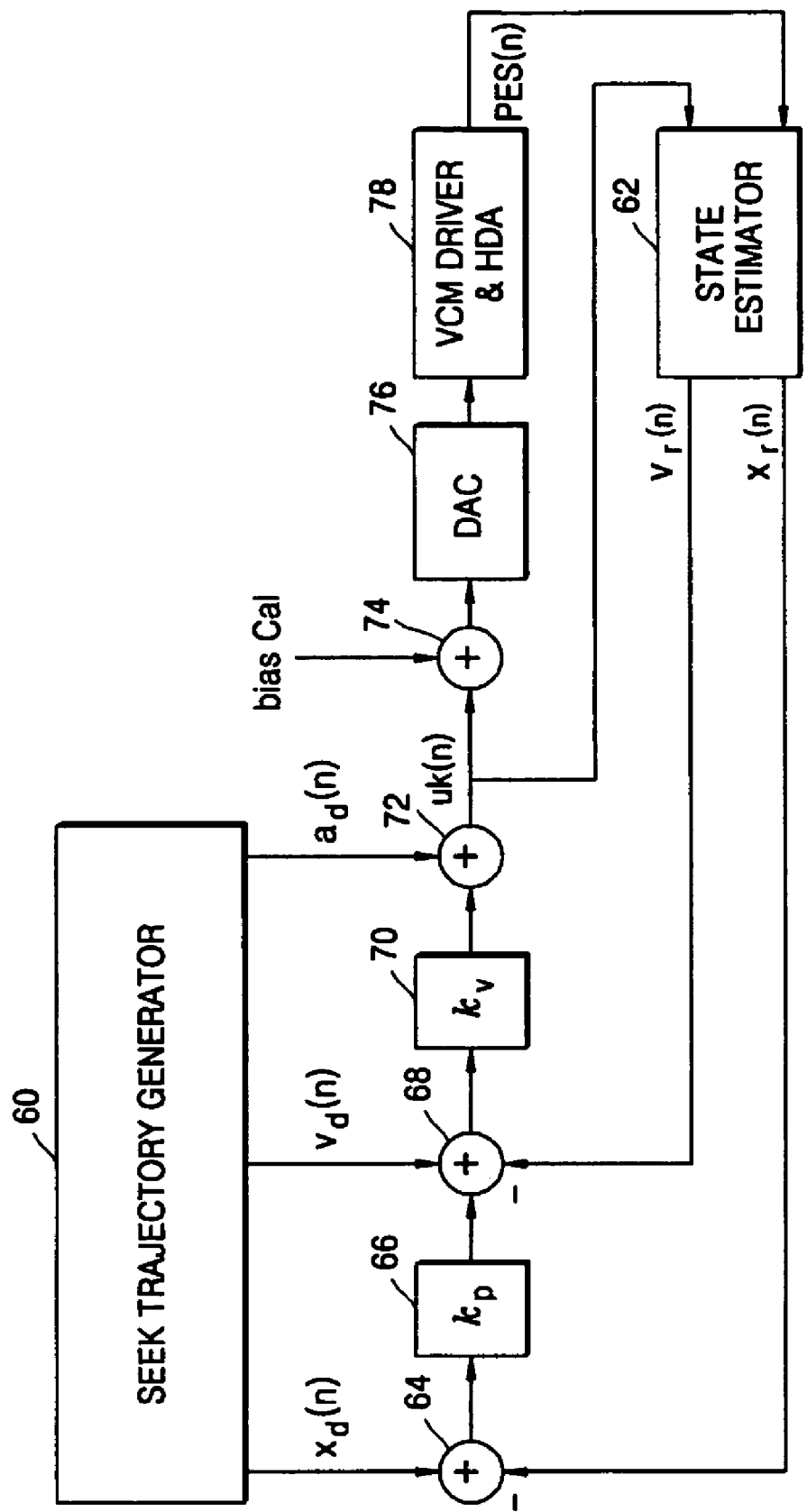
FIG. 3 illustrates a servo control system for a hard disk drive, according to an embodiment of the present invention.

FIG. 3 illustrates a seek servo control system, e.g., as performed by the controller 42.

A seek trajectory generator 60 may calculate the design position $x_d(n)$, design velocity $v_d(n)$, and design acceleration $a_d(n)$ of the transducer 16 from the sine wave acceleration trajectory and the velocity and position trajectories, obtained by integrating the acceleration trajectory whenever the transducer 16 reads a gray code of the track 34, for example.

The state estimator 62 may perform a process of estimating a state variable value of a transducer motion, including the actual position and actual velocity information of the transducer 16, by using a well-known state equation from a position error signal and control signal uk(n) that are being input, for example.

A first adder 64 may subtract the actual position value $x_r(n)$ from the design position value $x_d(n)$, and a position control gain compensator 66 may generate a position compensation value by multiplying the calculated difference between the design position value and the actual position value by the position gain ($k_p$) for position compensation.

A second adder 68 may add design velocity value $v_d(n)$ to the position compensation value generated in the position control gain compensator 66, and then subtract actual velocity value $v_r(n)$.

A velocity control gain compensator 70 may generate a velocity compensation value by multiplying the value calculated in the second adder 68 by velocity gain ($k_v$) for velocity compensation.

A third adder 72 may further generate seek driving current control value uk(n) by adding the velocity compensation value and the design acceleration value.

Accordingly, the seek driving current control value uk(n) and bias value (bias_cal) may be added, and then, converted into an analog signal by a digital/analog converter (DAC) 76, and applied to the VCM driver & HAD 78. Then, the VCM driver & HAD 82 may provide the voice coil with the seek driving current value determined according to the position of the transducer and the operational temperature.

The acceleration, velocity, position trajectories and current trajectory, according to a seek servo algorithm of a sine waveform, used in an embodiment of the present invention, can be obtained from the following Equation 1:

$$x(t) = K_A I_M \frac{T_{SK}}{2\pi}\left[t - \frac{T_{SK}}{2\pi}\sin\left(\frac{2\pi}{T_{SK}}t\right)\right] \quad (1)$$

$$v(t) = K_A I_M \frac{T_{SK}}{2\pi}\left[1 - \cos\left(\frac{2\pi}{T_{SK}}t\right)\right]$$

$$a(t) = K_A I_M \sin\left(\frac{2\pi}{T_{SK}}t\right)$$

$$I_M = \frac{2\pi X_{SK}}{K_A T_{SK}^2}$$

Here, $T_{SK}$ denotes a seek time, $I_M$ denotes a maximum current provided to the voice coil and $K_A$ denotes an acceleration constant.

In relation to a given seek length ($X_{SK}$), time (t) may be identical to the seek time ($T_{SK}$) and their relationship may follow according to the following Equation 2:

$$X_{SK} = x(T_{SK}) = K_A I_M \frac{T_{SK}^2}{2\pi} \quad (2)$$

From Equation 2, a seek time ($T_{SK}$) for a given seek length ($X_{SK}$) may be obtained by using the following Equation 3:

$$T_{SK} = \sqrt{\frac{2\pi X_{SK}}{K_A I_M}} \quad (3)$$

According to Equation 3, it can be seen that a calculated seek trajectory of a sine waveform, restricted by the current ($I_M$) applied to the voice coil motor, may be generated. Actually, however, a seek time determining the seek performance varies with respect to change of the voltage provided by the power supply.

Here, the voltage provided to the voice coil motor can be expressed as the following Equation 4:

$$V_S = L_{VCM}\frac{di}{dt} + R_{VCM} \cdot i + K_e \cdot \omega \quad (4)$$

$$\tau = K_t \cdot i$$

Here, VS denotes the voltage applied to the voice coil motor, i denotes the current of the voice coil motor, $L_{VCM}$ denotes the inductance of the voice coil motor, $R_{VCM}$ denotes teh resistance of the voice coil motor, Ke denotes the counter electromotive force constant, ω denotes the angular velocity of the voice coil motor, τ denotes the generated torque, $K_t$=torque constant.

In an idealistic case, the trajectory given, e.g., as in the above Equation 1, may be followed accurately, and if equations 1 and 4 are used, momentary maximum value $V_M$ of a voltage trajectory used to move a seek length of $X_{SK}$ for time $T_{SK}$ may, thus, be expressed according to the following Equation 5:

$$V_M(X_{SK}, T_{SK}) \equiv \max_{[0,T_{SK}]} V(t) = \quad (5)$$

$$K_e \frac{X_{SK}}{T_{SK}} + \sqrt{\left(\frac{2\pi R_{VCM} X_{SK}}{K_A T_{SK}^2}\right)^2 + \left(\frac{4\pi^2 L_{VCM} X_{SK}}{K_A T_{SK}^3} - \frac{K_e X_{SK}}{T_{SK}}\right)^2}$$

Here, Equation 5 shows a minimum voltage required to move a seek length of $X_{SK}$ for time $T_{SK}$. If this relation is used, in reverse manner, assuming that seek length $X_{SK}$ is provided under supply voltage constraint ($V_{max}$), the minimum seek time $T_{SK}$ that can be achieved by the seek control method of a sine waveform may be determined as a minimum value satisfying the following Equation 6:

$$V_M(X_{SK}, T_{SK}) = V_{max} \quad (6)$$

That is, the seek time may be expressed according to the following Equation 7:

$$T_{SK} = S(X_{SK}, V_{max}) \quad (7)$$

In addition, the resistance Rvcm of the voice coil motor also varies with respect to the change of the operational temperature of the disk drive, and thus the resistance Rvcm may be expressed as the following Equation 8:

$$Rvcm = R(T) \quad (8)$$

Usually, R(T) increases as temperature rises. Accordingly, as can be derived from Equation 5, momentary maximum value $V_M$ of a voltage trajectory used to follow, without an error, a current command corresponding to a given acceleration command also increases as temperature rises. In other words, at a predetermined temperature, a given current command may be accurately followed, whereas if the operational temperature rises, the required voltage also rises and reaches a voltage limit, such that the given current command will subsequently not be followed accurately.

If the given current command cannot be accurately followed, noise increases or the settling characteristic may be deteriorated such that the consistency of the seek time will become degraded.

However, if a seek time is determined using a worst condition, e.g., that the required voltage is at a maximum, the seek time may be determined as a minimum seek time satisfying the following Equation 9 at a maximum temperature Tmax:

$$V_M(X_{SK}, T_{SK}, T_{max}) = V_{max} \quad (9)$$

That is, the minimum seek time $T_{SK}$ may be expressed as the following Equation 10:

$$T_{SK} = S(X_{SK}, V_{max}, T_{max}) \quad (10)$$

Figure 5:
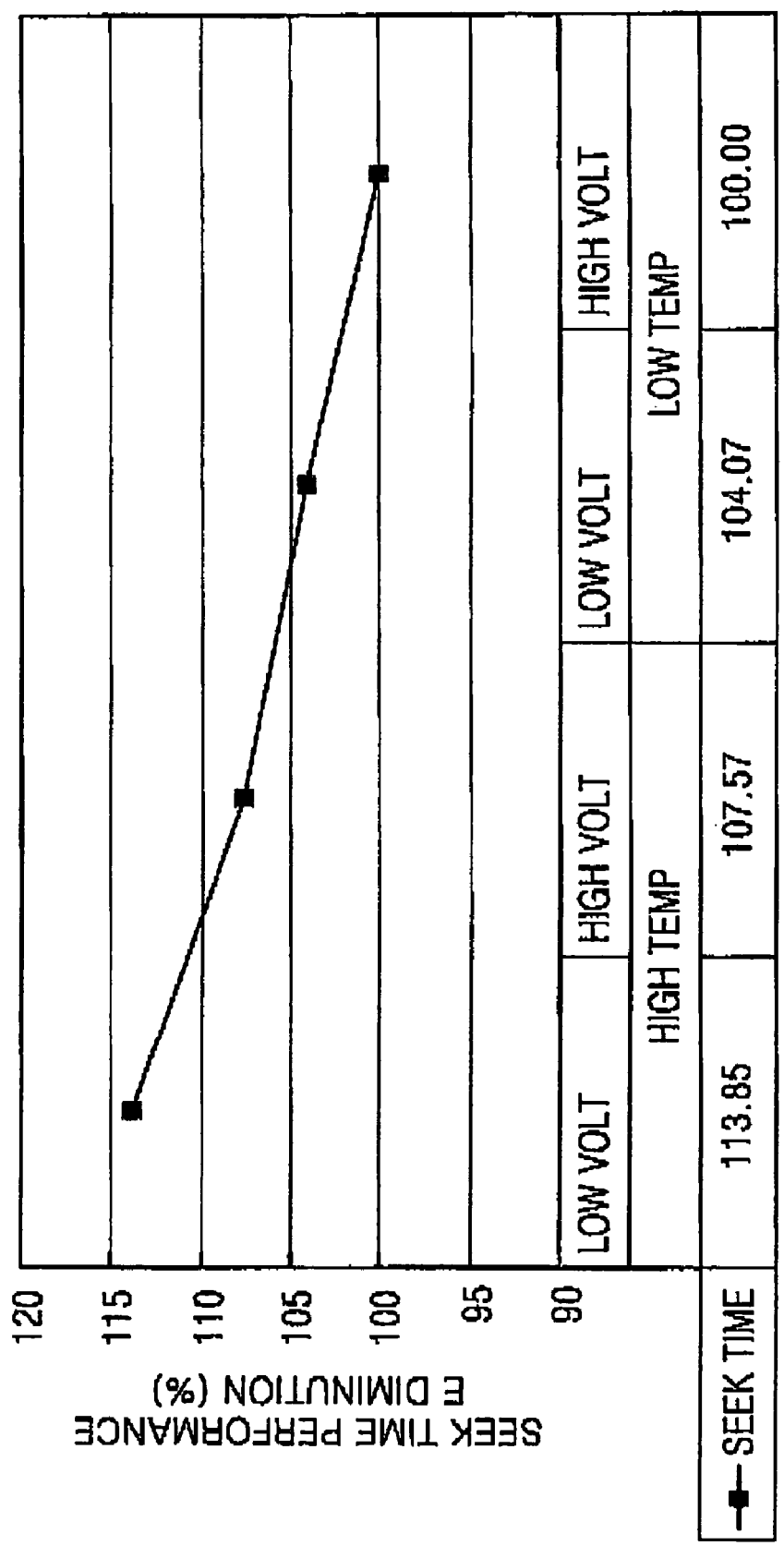
FIG. 5 illustrates a relationship between a seek time and an operational temperature and applied voltage of a hard disk drive, according to an embodiment of the present invention.

From the graph illustrated in FIG. 5, showing the relationship between supply voltage and an average seek time, with respect to operational temperature, it can be seen that under an identical supply voltage constraint, the seek time increases as the operational temperature rises. In other words, in relation to an identical seek time the maximum value of a required voltage trajectory increases as the temperature rises. Thus, if the seek time is set without regard to an operational temperature change, the seek performance cannot be guaranteed because of the shortage of a required supply voltage.

In order to solve this drawback, in embodiments of the present invention, a seek servo method may be implemented to determine a seek time adaptively with respect to the operational temperature change of a disk drive.

Embodiments of the present invention may be applied in a variety of seek servo methods, but for convenience of explanation, only a case where such a method is applied to the seek servo method with a sine waveform with a limited supply voltage will now be described in greater detail.

In a seek mode, if a current temperature (T) at which the disk drive operates is measured, a new seek time $T_{SK}(T)$, considering the voltage limit and operational temperature in relation to a given seek length $X_{SK}$, may be determined from the following Equation 11:

$$T_{SK}(T) = S(X_{SK}, V_{max}, T) \quad (11)$$

If the seek time $T_{SK}(T)$ is determined, position, velocity and acceleration trajectories may then be derived from the Equation 1.

Since the process for calculating a seek time from a seek length may be very complicated, it may be difficult to calculate the same by using firmware in the middle of the operating of the disk drive, for example. Accordingly, according to a further embodiment of the present invention, representative seek lengths $[X_{SK}^1, X_{SK}^2, \ldots, X_{SK}^N]$ may be selected based on the operational temperature ($T_o$, for example, 25° C.), and, as examples, seek times $[X_{SK}^1, X_{SK}^2, \ldots, X_{SK}^N]$ in relation to these seek lengths may be calculated in advance according to a seek method, according to an embodiment of the present invention, with a sine waveform, considering voltage limit, and stored in a ROM table (e.g., a 1st table). Then, the firmware may refer to this ROM table and obtains seek time $T_{SK}(T_o)$ in relation to the given seek length $X_{SK}$ from the Equation 7 based on linear interpolation, for example.

In a similar method, at a predetermined temperature ($T = T_o + dT$) a new minimum seek time $T_{SK}(T)$, in relation to a given seek length $X_{SK}$, may be calculated by using Equation 11.

By using the thus obtained $T_{SK}(T_o)$ and $T_{SK}(T)$, a scale factor $\gamma(dT)$, which is an adjustment value of a seek time with respect to temperature change, may be calculated according to the following Equation 12:

$$\gamma(dT) \equiv \frac{T_{SK}(T_o + dT)}{T_{SK}(T_o)} \quad (12)$$

The scale factor $\gamma(dT)$ may be obtained for each of the representative temperature values and then stored in a ROM table (e.g., a 2nd table). According to an embodiment of the present invention, the firmware may refer to this ROM table and the scale factor corresponding to a temperature may be calculated by linear interpolation, for example.

Accordingly, under a voltage limit using a seek control method, according to an embodiment of the present invention, with a sine waveform, seek time $T_{SK}(X_{SK}, T)$ at operational temperature $T = T_o + dT$ in relation to seek length $X_{SK}$ can be easily calculated by using the following Equation 13, which is a combination of Equations 7 and 12:

$$T_{SK}(X_{SK}, dT) = S(X_{SK}, V_{max}) \cdot \gamma(dT) \quad (13)$$

Correspondingly, as described in U.S. patent application Ser. No. 10-2004-57545, "Method of torque change with respect to temperature in a seek servo," invented and applied for by the present applicant, in order to prevent deterioration of a seek time with respect to a change in torque constant Kt change, by temperature change, the torque constant change by the temperature change may be reverse compensated for in an acceleration command or a current command. By doing so, even though the temperature changes, identical seek performance can be achieved.

Accordingly, it can be seen that even if an actual current perfectly follows the current command trajectory given in Equation 1, the actual acceleration cannot be the same as a desired value because of deterioration of torque constant by the temperature change.

However, when such a methodology of changing a torque constant with respect to temperature change is employed, the amount of current increases in proportion to the change of torque constant Kt, which causes an increase in another required voltage in addition to the resistance increase of the voice coil motor by the temperature change.

Rather, in embodiments of the present invention, in order to solve this drawback, when the operational temperature of the disk drive changes, an optimum seek time may be determined by considering the resistance change of the voice coil motor and the torque constant change together.

Current magnitude compensation value Kt(T), in relation with the torque constant change, may be linearly approximated and then used for convenience of implementation, for example. Also, it may further be assumed that, within a temperature range in which the disk drive operates, resistance Rvcm(T) of the voice coil motor also changes linearly.

Accordingly, a torque constant and the resistance value of the voice coil motor may be expressed as the following Equation 14:

$$k(T) = [1 + \alpha \cdot (T - T_o)]$$

$$Rvcm(T) = R_o \cdot [1 + \beta \cdot (T - T_o)] \quad (14)$$

If Equation 14 is substituted in Equation 1 and the momentary maximum value of the voltage trajectory of Equation 1 is approximated, Equation 1 may, rather, be expressed according to the following Equation 15:

$$V_M(X_{SK}, T_{SK}, T) \cong \frac{2\pi R_{VCM} X_{SK}}{K_A T_{SK}^2} = \frac{2\pi X_{SK} R_o}{K_A T_{SK}(T)^2} \cdot [1 + \alpha \cdot (T - T_o)] \cdot [1 + \beta \cdot (T - T_o)] \quad (15)$$

Accordingly, if Equations 7 and 8 are used, when it is assumed that a minimum seek time that a given seek trajectory can be followed without an error at operational temperature $T_o$ is $T_{SK}(T_o)$, a minimum seek time $T_{SK}(T)$ that a given seek trajectory can be followed without an error when the operational temperature changes to $T=T_o+dT$ may be approximated as according to the following Equation 16:

$$T_{SK}(T_o + dT) = \sqrt{(1 + \alpha \cdot dT) \cdot (1 + \beta \cdot dT)} \cdot T_{SK}(T_o) \quad (16)$$

Accordingly, when a seek time is adjusted by considering together the resistance value change of the voice coil motor and the torque constant change with respect to an operational temperature change, the adjustment value of the seek time for operational temperature $T=T_o+dT$, in relation to standard temperature $T_o$, can be obtained according to the following Equation 17:

$$\gamma(dT) = \frac{T_{SK}(T_o + dT)}{T_{SK}(T_o)} = \sqrt{[1 + \alpha \cdot dT] \cdot [1 + \beta \cdot dT]} \quad (17)$$

Accordingly, if Equation 17 is substituted in Equation 13, an optimum seek time at the operational temperature of the disk drive, by considering together the resistance value change of the voice coil motor and the torque constant change with respect to temperature change, can be obtained.

Figure 6:
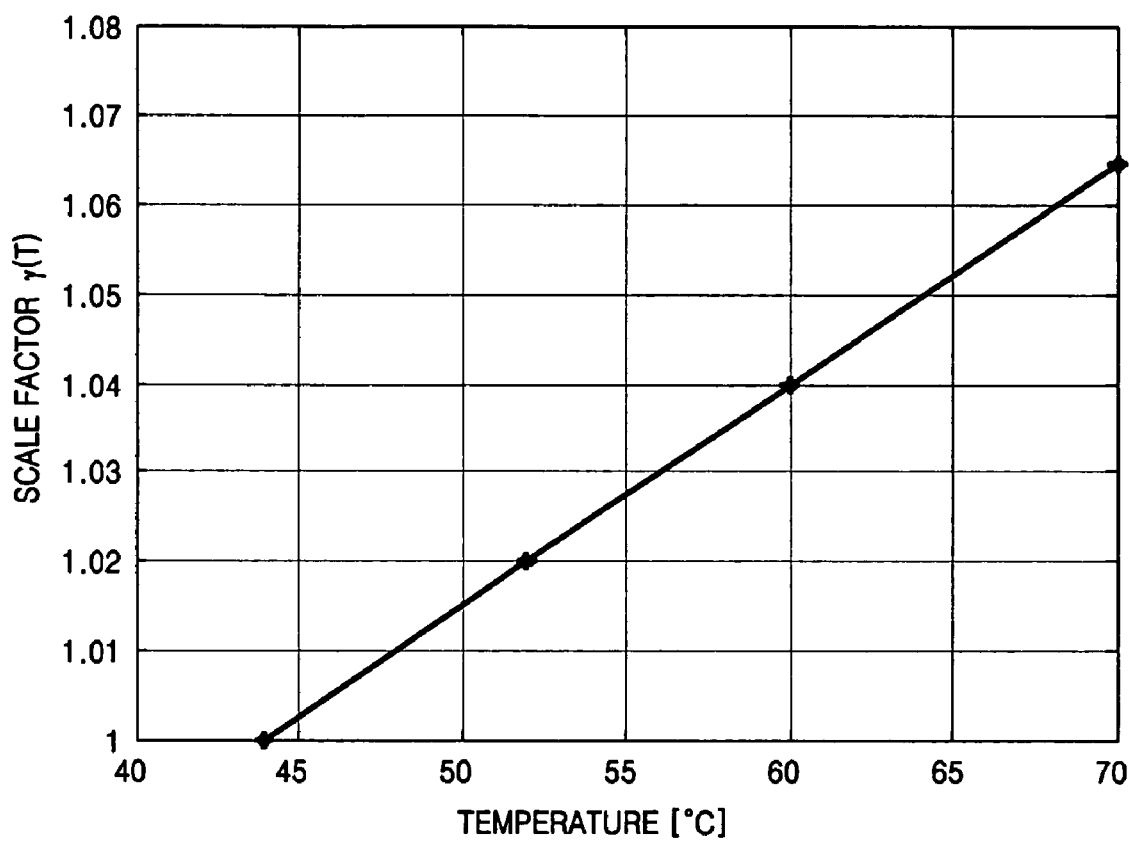
FIG. 6 illustrates scale factor γ(dT) values with respect to an operational temperature change of a hard disk drive, according to an embodiment of the present invention.

FIG. 6 illustrates scale factor values obtained from Equation 17, according to an embodiment of the present invention, with respect to the operational temperature change of the disk drive.

A detailed method of performing seek servo control considering temperature change, according to an embodiment of the present invention, using the aforementioned obtained first and second table information, will now be described in greater detail with reference to FIG. 4.

The controller 42 may determine whether a seek command, e.g., from a host device (not shown), has been received through the host interface 53, in operation S401.

If a seek command has been received, by using the first table information described above, a standard seek time $T_{SK}(T_o)$ in relation to a given seek length at a standard temperature may be obtained, in operation S402.

Current operational temperature information of the disk drive, e.g., measured by the temperature sensing unit 56, may be detected, in operation S403.

A scale factor $\gamma(dT)$ value, which is a seek time adjustment value corresponding to the difference between the standard temperature ($T_o$) and the current operational temperature ($T_o+dT$), can be obtained, in operation S404.

By substituting scale factor $\gamma(dT)$ into Equation 13, a final seek time at the measured operational temperature may be calculated, in operation S405.

Accordingly, position, velocity, and acceleration trajectories, according to the final seek time calculated in operation S405, may be obtained from Equation 1, in operation S406.

By applying the position, velocity, and acceleration trajectories obtained in operation S406 to a seek servo control system, according to an embodiment of the present invention, such as that of FIG. 3, seek control may be performed, in operation S407.

Figure 4:
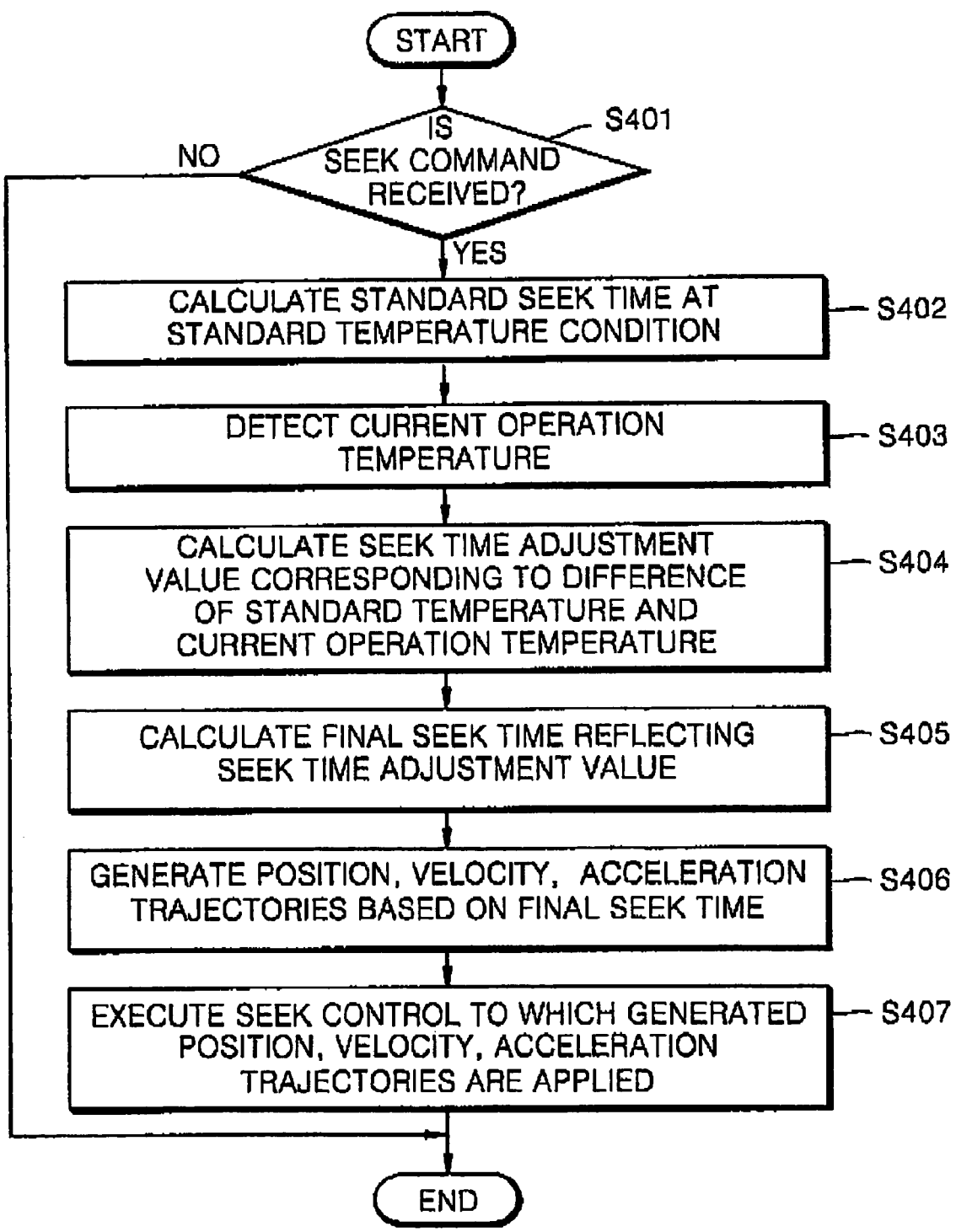
FIG. 4 illustrates a seek servo control method considering temperature change, according to an embodiment of the present invention.

Though, according to an embodiment of the present invention, a method of adjusting a seek time by considering only the resistance change of the voice coil motor with respect to the operational temperature change of the disk drive is suggested in the flowchart of FIG. 4, embodiments of the present invention may be implemented such that a seek time is adjusted by considering together a torque constant with respect to operational temperature change.

As noted above, according to an embodiment of the present invention, a method of calculating an optimum seek length at an operational temperature can be implemented using a ROM table defining the relationship between a seek length and a seek time with respect to the operational temperature. Also, as another embodiment, embodiments of the present invention may be implemented without using the ROM table, e.g., the relation between a seek length and a seek time with respect to the operational temperature may be approximated to a polynomial, and then by using the approximated polynomial, an optimum seek length at the operational temperature may be calculated, noting that additional embodiments are equally available.

Embodiments of the present invention may be embodied at least as a method, apparatus, and a system. When it is embodied as computer readable code, e.g., software, elements of the present invention may be implemented through code segments executing differing functions/operations. Such computer readable code may be stored by a medium, e.g., a processor readable recording medium, and/or can be transmitted/transferred by a medium, such as in a computer data signal, e.g., coupled with a carrier in a transmission medium or communication networks, noting that alternative embodiments are equally available. The medium may be any medium that can store/transfer/transmit information. Examples of the medium may include electronic circuits, semiconductor memory devices, read-only memory (ROM), random-access memory (RAM), flash memory, EEPROM, floppy disks, optical data storage devices, hard disck, optical fiber media, and radio frequency (RF) network, for example, noting again that alternative embodiments are equally available. As another example, when the media is a computer data signal(s) the medium could at least include any signal that can be transmitted through electronic network channels, optical fiber, air, electromagnetic field, and RF networks.

Thus, according to embodiments of present invention, as at least described above, a seek time may be adjusted so that a seek control characteristic change caused by a resistance value change of the voice coil motor with respect to the operational temperature of the disk drive can be compensated. By doing so, a precision of the seek servo control is improved and the average seek time can be reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A seek servo control method considering temperature change for controlling a disk drive, the method comprising:
determining a seek time based on a given seek length and a relationship between seek times and operational temperature changes of the disk drive or a relationship between the given seek length and the operational temperature changes of the disk drive, based on a measured operational temperature, in a seek mode; and
generating position, velocity, and acceleration trajectories to move a transducer of the disk drive according to the determined seek time.

2. A seek servo control method considering temperature change for controlling a disk drive, the method comprising:
determining a seek time based on a given seek length and a relationship between seek times and operational temperature changes of the disk drive or a relationship between the given seek length and the operational temperature changes of the disk drive, based on a measured operational temperature, in a seek mode; and
generating position, velocity, and acceleration trajectories to move a transducer of the disk drive according to the determined seek time,
wherein the seek time is determined by considering a change amount of a voltage corresponding to a resistance change of a voice coil motor of the disk drive with respect to operational temperature change.

3. A seek servo control method considering temperature change for controlling a disk drive, the method comprising:
determining a seek time based on a given seek length and a relationship between seek times and operational temperature changes of the disk drive or a relationship between the given seek length and the operational temperature changes of the disk drive, based on a measured operational temperature, in a seek mode; and
generating position, velocity, and acceleration trajectories to move a transducer of the disk drive according to the determined seek time,
wherein the seek time is determined by considering together a change amount of a torque constant of a voice coil motor and a change amount of a voltage corresponding to a resistance change of the voice coil motor with respect to operational temperature change.

4. A seek servo control method considering temperature change for controlling a disk drive, the method comprising:
determining a seek time based on a given seek length and a relationship between seek times and operational temperature changes of the disk drive or a relationship between the given seek length and the operational temperature changes of the disk drive, based on a measured operational temperature, in a seek mode; and
generating position, velocity, and acceleration trajectories to move a transducer of the disk drive according to the determined seek time,
wherein the seek mode considers a voltage limit of a voice coil motor of the disk drive.

5. The method of claim 4, wherein the seek time is determined to be within a range that a maximum value of a voltage trajectory for the voice coil motor does not exceed a limited supply voltage for the voice coil motor.

6. The method of claim 4, wherein the seek mode uses a sine waveform seek servo control method.

7. A seek servo control method considering temperature change for controlling a disk drive, the method comprising:
determining a seek time based on a given seek length and operational temperature change of the disk drive, in a seek mode; and
generating position, velocity, and acceleration trajectories to move a transducer of the disk drive according to the determined seek time,
wherein the seek mode considers a voltage limit of a voice coil motor of the disk drive
wherein the seek time is determined by using a first table or table portion defining a relationship between seek times with respect to seek lengths at standard temperatures, and a second table or table portion defining adjustment values of seek times with respect to operational temperatures.

8. The method of claim 7, wherein seek times corresponding to given seek times and sensed operational temperatures, and adjustment values of the seek times are readable from the first table or table portion and the second table or table portion, respectively, such that the seek time is determined by a calculation reflecting an adjustment value for a seek time read from the second table or table portion based on a value read from the first table or table portion.

9. The method of claim 4, wherein the seek time is calculated by using a polynomial approximating a relationship between seek lengths and seek times with respect to operational temperature.

10. A seek servo control method considering temperature change in seek controlling of a disk drive, the method comprising:
calculating a standard seek time with respect to a seek length based on a standard temperature if a seek command is input;
sensing an operational temperature of the disk drive;
calculating an adjustment value for a seek time corresponding to a difference between the standard temperature and the operational temperature;
calculating a final seek time by reflecting the adjustment value of the seek time with the standard seek time;
generating position, velocity, and acceleration trajectories based on the final seek time; and
performing track seek control by using the generated position, velocity, and acceleration trajectories.

11. A seek servo control method considering temperature change in seek controlling of a disk drive, the method comprising:
calculating a standard seek time with respect to a seek length based on a standard temperature if a seek command is input;
sensing an operational temperature of the disk drive;
calculating an adjustment value for a seek time corresponding to a difference between the standard temperature and the operational temperature;
calculating a final seek time by reflecting the adjustment value of the seek time with the standard seek time;
generating position, velocity, and acceleration trajectories based on the final seek time; and
performing track seek control by using the generated position, velocity, and acceleration trajectories,
wherein the adjustment value of the seek time is determined by considering a change amount of a voltage corresponding to a resistance change of a voice coil motor of the disk drive with respect to operational temperature change.

12. A seek servo control method considering temperature change in seek controlling of a disk drive, the method comprising:
calculating a standard seek time with respect to a seek length based on a standard temperature if a seek command is input;
sensing an operational temperature of the disk drive;

calculating an adjustment value for a seek time corresponding to a difference between the standard temperature and the operational temperature;

calculating a final seek time by reflecting the adjustment value of the seek time with the standard seek time;

generating position, velocity, and acceleration trajectories based on the final seek time; and performing track seek control by using the generated position, velocity, and acceleration trajectories, wherein the adjustment value of the seek time is determined by considering together a change amount of a torque constant of a voice coil change and a change amount of a voltage corresponding to a resistance change of the voice coil motor of the disk drive with respect to operational temperature change.

13. A seek servo control method considering temperature change in seek controlling of a disk drive, the method comprising:

calculating a standard seek time with respect to a seek length based on a standard temperature if a seek command is input;

sensing an operational temperature of the disk drive;

calculating an adjustment value for a seek time corresponding to a difference between the standard temperature and the operational temperature;

calculating a final seek time by reflecting the adjustment value of the seek time with the standard seek time;

generating position, velocity, and acceleration trajectories based on the final seek time; and performing track seek control by using the generated position, velocity, and acceleration trajectories, wherein the position, velocity, and acceleration trajectories are generated by seek servo algorithm considering a voltage limit of a voice coil motor of the disk drive.

14. The method of claim 13, wherein the final seek time is determined to be within a range that a maximum value of a voltage trajectory for the voice coil motor does not exceed a limited supply voltage.

15. The method of claim 13, wherein the seek mode uses a sine waveform seek servo control method.

16. The method of claim 13, wherein the final seek time is determined by using a first table or table portion defining a relationship between seek times with respect to seek lengths at standard temperatures, and a second table or table portion defining adjustment values of seek times with respect to operational temperatures.

17. The method of claim 16, wherein seek times corresponding to given seek times and sensed operational temperatures, and adjustment values of the seek times are readable from the first table or table portion and the second table or table portion, respectively, such that the final seek time is determined by a calculation reflecting an adjustment value for a seek time read from the second table or table portion based on a value read from the first table or table portion.

18. The method of claim 13, wherein the final seek time is calculated by using a polynomial approximating a relationship of seek lengths and seek times with respect to operational temperatures.

19. A disk drive in a data storage apparatus, the disk drive comprising:

a transducer to write information on and/or read information from a disk;

a voice coil motor to move the transducer;

a temperature sensing unit to measure an operational temperature of the disk drive; and a controller to determine a seek time by considering a seek length and a relationship between seek times and operational temperature changes of the disk drive or a relationship between the given seek length and the operational temperature changes of the disk drive, based on the measured operational temperature, to generate position, velocity and acceleration trajectories according to the determined seek time, and by using the generated position, velocity, and acceleration trajectories, to control a driving current of the voice coil motor.

20. A disk drive in a data storage apparatus, the disk drive comprising:

a transducer to write information on and/or read information from a disk;

a voice coil motor to move the transducer;

a temperature sensing unit to measure an operational temperature of the disk drive; and a controller to determine a seek time by considering a seek length and a relationship between seek times and operational temperature changes of the disk drive or a relationship between the given seek length and the operational temperature changes of the disk drive, based on the measured operational temperature, to generate position, velocity and acceleration trajectories according to the determined seek time, and by using the generated position, velocity, and acceleration trajectories, to control a driving current of the voice coil motor, wherein the seek time is determined by considering a change amount of a voltage corresponding to a resistance change of the voice coil motor with respect to operational temperature change.

21. A disk drive in a data storage apparatus, the disk drive comprising:

a transducer to write information on and/or read information from a disk;

a voice coil motor to move the transducer;

a temperature sensing unit to measure an operational temperature of the disk drive; and a controller to determine a seek time by considering a seek length and a relationship between seek times and operational temperature changes of the disk drive or a relationship between the given seek length and the operational temperature changes of the disk drive, based on the measured operational temperature, to generate position, velocity and acceleration trajectories according to the determined seek time, and by using the generated position, velocity, and acceleration trajectories, to control a driving current of the voice coil motor, wherein the seek time is determined by considering together a change amount of a torque constant of the voice coil motor and a change amount of a voltage corresponding to a resistance change of the voice coil motor with respect to operational temperature change.

22. A disk drive in a data storage apparatus, the disk drive comprising:

a transducer to write information on and/or read information from a disk;

a voice coil motor to move the transducer;

a temperature sensing unit to measure an operational temperature of the disk drive; and a controller to determine a seek time by considering a seek length and a relationship between seek times and operational temperature changes of the disk drive or a relationship between the given seek length and the operational temperature changes of the disk drive, based on the measured operational temperature, to generate position, velocity and acceleration trajectories according to the determined seek time, and by using the generated position, velocity, and acceleration trajectories, to control a driving current of the voice coil motor, wherein the position, velocity, and acceleration trajectories are generated considering a voltage limit of the voice coil motor.

23. The disk drive of claim 22, wherein the seek time is determined to be within a range that a maximum value of a voltage trajectory for the voice coil motor does not exceed a limited supply voltage.

24. The disk drive of claim 22, wherein the seek mode uses sine waveform seek servo control.

25. A disk drive in a data storage apparatus, the disk drive comprising:
   a transducer to write information on and/or read information from a disk;
   a voice coil motor to move the transducer;
   a temperature sensing unit to measure an operational temperature of the disk drive; and
   a controller to determine a seek time by considering a seek length and the operational temperature, to generate position, velocity and acceleration trajectories according to the determined seek time, and by using the generated position, velocity, and acceleration trajectories, to control a driving current of the voice coil motor,
   wherein the position, velocity, and acceleration trajectories are generated considering a voltage limit of the voice coil motor, wherein seek times are determined by using a first table or table portion defining a relationship between seek times with respect to seek lengths at standard temperatures, and a second table or table portion defining adjustment values of seek times with respect to operational temperatures.

26. The disk drive of claim 25, wherein seek times corresponding to given seek times and sensed operational temperatures, and adjustment values of the seek times are readable from the first table or table portion and the second table or table portion, respectively, such that the seek time is determined by a calculation reflecting an adjustment value for a seek time read from the second table or table portion based on a value read from the first table or table portion.

27. The disk drive of claim 22, wherein the seek time is calculated by using a polynomial approximating a relationship of seek lengths and seek times with respect to operational temperatures.

28. A disk drive in a data storage apparatus, the disk drive comprising:
   a transducer to write information on and/or read information from a disk;
   a voice coil motor to move the transducer;
   a temperature sensing unit to measure an operational temperature of the disk drive; and
   a controller to determine a seek time by considering a seek length and the operational temperature, to generate position, velocity and acceleration trajectories according to the determined seek time, and by using the generated position, velocity, and acceleration trajectories, to control a driving current of the voice coil motor,
   wherein the position, velocity, and acceleration trajectories are generated considering a voltage limit of the voice coil motor,
   wherein the determining of the seek time comprises:
   calculating a standard seek time with respect to a seek length based on a standard temperature;
   sensing the operational temperature of the disk drive;
   calculating the adjustment value of the seek time corresponding to a difference between the standard temperature and the operational temperature; and
   calculating a final seek time by reflecting the adjustment value of the seek time with the standard seek time.

29. At least one recording medium comprising computer readable code to control a processor to implement the method of claim 1.

30. The method of claim 1, wherein the determining of the seek time comprises determining the seek time based on the given seek length and the relationship between seek times and the operational temperature changes of the disk drive and the relationship between the given seek length and the operational temperature changes of the disk drive, based on the measured operational temperature, in the seek mode.

31. The method of claim 2, wherein the determining of the seek time comprises determining the seek time based on the given seek length and the relationship between seek times and the operational temperature changes of the disk drive and the relationship between the given seek length and the operational temperature changes of the disk drive, based on the measured operational temperature, in the seek mode.

32. The method of claim 3, wherein the determining of the seek time comprises determining the seek time based on the given seek length and the relationship between seek times and the operational temperature changes of the disk drive and the relationship between the given seek length and the operational temperature changes of the disk drive, based on the measured operational temperature, in the seek mode.

33. The method of claim 4, wherein the determining of the seek time comprises determining the seek time based on the given seek length and the relationship between seek times and the operational temperature changes of the disk drive and the relationship between the given seek length and the operational temperature changes of the disk drive, based on the measured operational temperature, in the seek mode.

34. The disk drive of claim 19, wherein the controller determines the seek time by considering the seek length and the relationship between the seek times and the operational temperature changes of the disk drive and the relationship between the given seek length and the operational temperature changes of the disk drive, based on the measured operational temperature.

35. The disk drive of claim 20, wherein the controller determines the seek time by considering the seek length and the relationship between the seek times and the operational temperature changes of the disk drive and the relationship between the given seek length and the operational temperature changes of the disk drive, based on the measured operational temperature.

36. The disk drive of claim 21, wherein the controller determines the seek time by considering the seek length and the relationship between the seek times and the operational temperature changes of the disk drive and the relationship between the given seek length and the operational temperature changes of the disk drive, based on the measured operational temperature.

37. The disk drive of claim 22, wherein the controller determines the seek time by considering the seek length and the relationship between the seek times and the operational temperature changes of the disk drive and the relationship between the given seek length and the operational temperature changes of the disk drive, based on the measured operational temperature.

* * * * *

UNITED STATES PATENT AND TRADEMARK OFFICE
CERTIFICATE OF CORRECTION

| | |
|---|---|
| PATENT NO. | : 7,369,352 B2 |
| APPLICATION NO. | : 11/409056 |
| DATED | : May 6, 2008 |
| INVENTOR(S) | : Sang-hoon Chu et al. |

It is certified that error appears in the above-identified patent and that said Letters Patent is hereby corrected as shown below:

Column 16, Line 5, after "drive" insert --,--.

Signed and Sealed this

Seventh Day of October, 2008

JON W. DUDAS
*Director of the United States Patent and Trademark Office*